US012627509B2

(12) United States Patent
Yamada

(10) Patent No.: US 12,627,509 B2
(45) Date of Patent: *May 12, 2026

(54) CRYPTOGRAPHICALLY AUTHENTICATED DATABASE REPRESENTING A MULTIPLE-KEY-PAIR ROOT CERTIFICATE AUTHORITY

(71) Applicant: ISARA Corporation, Waterloo (CA)

(72) Inventor: Atsushi Yamada, Waterloo (CA)

(73) Assignee: ISARA Corporation, Waterloo (CA)

( * ) Notice: Subject to any disclaimer, the term of this patent is extended or adjusted under 35 U.S.C. 154(b) by 367 days.

This patent is subject to a terminal disclaimer.

(21) Appl. No.: 18/356,909

(22) Filed: Jul. 21, 2023

(65) Prior Publication Data

US 2024/0031172 A1 Jan. 25, 2024

Related U.S. Application Data

(60) Provisional application No. 63/391,465, filed on Jul. 22, 2022.

(51) Int. Cl.
*H04L 9/32* (2006.01)
*H04L 9/00* (2022.01)
*H04L 9/30* (2006.01)

(52) U.S. Cl.
CPC .......... *H04L 9/3265* (2013.01); *H04L 9/3073* (2013.01); *H04L 9/3247* (2013.01); *H04L 9/3268* (2013.01); *H04L 9/50* (2022.05)

(58) Field of Classification Search
CPC ... H04L 9/3265; H04L 9/3073; H04L 9/3247; H04L 9/3268; H04L 9/50; H04L 2209/64

(Continued)

(56) References Cited

U.S. PATENT DOCUMENTS 5,214,702 A 5/1993 Fischer
5,610,982 A 3/1997 Micali
(Continued)

FOREIGN PATENT DOCUMENTS

CN 106301792 1/2017
CN 106789041 5/2017
(Continued)

OTHER PUBLICATIONS

USPTO, Notice of Allowance issued in U.S. Appl. No. 18/356,897 on May 28, 2025, 26 pages.

(Continued)

*Primary Examiner* — Bryan F Wright
(74) *Attorney, Agent, or Firm* — Henry Patent Law Firm PLLC

(57) ABSTRACT

In a general aspect, a cryptography system includes a multiple-key pair root certificate authority. In some aspects, a plurality of distinct cryptographic pairs of public keys and private keys of a root certificate authority are generated. A plurality of distinct self-signed root certificates of the root certificate authority are generated. The plurality of distinct self-signed root certificates are each based on and correspond to a respective one of plurality of distinct cryptographic key pairs. A cryptographically authenticated database is generated that includes the plurality of distinct self-signed root certificates and represents the root certificate authority. The cryptographically authenticated database includes validity information of each of the plurality of self-signed root certificates. The cryptographically authenticated database is distributed to entities in a public key infrastructure. The entities can use the validity information to cryptographically verify the validity or invalidity of each of the plurality of distinct self-signed root certificate.

24 Claims, 10 Drawing Sheets

(58) Field of Classification Search
USPC .......................................................... 713/175
See application file for complete search history.

(56) References Cited

U.S. PATENT DOCUMENTS

| | | | |
|---|---|---|---|
| 6,134,327 | A | 10/2000 | Van Oorschot |
| 6,553,493 | B1 | 4/2003 | Okumura et al. |
| 9,660,978 | B1 | 5/2017 | Truskovsky et al. |
| 9,794,249 | B1 | 10/2017 | Truskovsky et al. |
| 9,875,510 | B1 | 1/2018 | Kasper |
| 9,882,918 | B1 | 1/2018 | Ford et al. |
| 10,425,401 | B1 | 9/2019 | Pecen et al. |
| 10,958,450 | B1 | 3/2021 | Yamada |
| 2001/0018739 | A1 | 8/2001 | Anderson et al. |
| 2002/0118094 | A1 | 8/2002 | Kambara et al. |
| 2004/0193872 | A1 | 9/2004 | Saarepera et al. |
| 2009/0113206 | A1 | 4/2009 | Shen-orr |
| 2013/0346747 | A1 | 12/2013 | Ignatchenko |
| 2015/0332283 | A1 | 11/2015 | Witchey |
| 2016/0027229 | A1 | 1/2016 | Spanos et al. |
| 2016/0234028 | A1 | 8/2016 | Tevemark |
| 2016/0292680 | A1 | 10/2016 | Wilson et al. |
| 2017/0046651 | A1 | 2/2017 | Lin et al. |
| 2017/0250827 | A1 | 8/2017 | Opschroef et al. |
| 2017/0323392 | A1 | 11/2017 | Kasper et al. |
| 2018/0082043 | A1 | 3/2018 | Witchey et al. |
| 2018/0115416 | A1 | 4/2018 | Diehl |
| 2018/0219669 | A1 | 8/2018 | Chen et al. |
| 2018/0227275 | A1 | 8/2018 | Russinovich et al. |
| 2018/0260212 | A1 | 9/2018 | Wisnovsky |
| 2018/0343126 | A1 | 11/2018 | Fallah et al. |
| 2019/0012249 | A1 | 1/2019 | Mercuri et al. |
| 2019/0036711 | A1 | 1/2019 | Qui |
| 2019/0199535 | A1 | 6/2019 | Falk |
| 2019/0205547 | A1 | 7/2019 | Horvath |
| 2019/0205873 | A1 | 7/2019 | Kamalsky et al. |
| 2019/0207767 | A1 | 7/2019 | Ahn |
| 2019/0207781 | A1 | 7/2019 | Harpur et al. |
| 2019/0317924 | A1 | 10/2019 | Alimi et al. |
| 2019/0372777 | A1 | 12/2019 | Choi |
| 2020/0084194 | A1 | 3/2020 | Mcmurdie et al. |
| 2020/0145234 | A1 | 5/2020 | Nishijima |
| 2020/0186509 | A1 | 6/2020 | Kursun |
| 2020/0244464 | A1 | 7/2020 | Mclean et al. |
| 2020/0327100 | A1 | 10/2020 | Androulaki et al. |
| 2020/0334685 | A1 | 10/2020 | Yan |
| 2022/0164214 | A1* | 5/2022 | Yu ........................ G06F 9/45558 |
| 2024/0031176 | A1 | 1/2024 | Yamada |

FOREIGN PATENT DOCUMENTS

| | | |
|---|---|---|
| CN | 107070644 | 8/2017 |
| CN | 112217793 A | 1/2021 |
| WO | 2019195940 | 10/2019 |
| WO | 2022077092 | 4/2022 |

OTHER PUBLICATIONS

JPO, Office Action mailed Nov. 2, 2021, in JP 2021-501061, 11 pgs.
WIPO, International Search Report and Written Opinion mailed Jun. 17, 2021, in PCT/CA2021/050081, 13 pgs.

USPTO, Non-Final Office Action dated Feb. 27, 2020, in U.S. Appl. No. 16/380,548, 15 pages.
WIPO, International Search Report and Written Opinion mailed Jun. 25, 2019, in PCT/CA2019/050443, 16 pgs.
USPTO, Non-Final Office Action mailed Jun. 16, 2022, in U.S. Appl. No. 16/380,548, 17 pgs.
USPTO, Notice of Allowance mailed Dec. 30, 2020, in U.S. Appl. No. 17/071,451, 17 pgs.
USPTO, Non-Final Office Action mailed Jul. 18, 2019, in U.S. Appl. No. 16/380,548, 18 pgs.
USPTO, Non-Final Office Action mailed May 3, 2021, in U.S. Appl. No. 16/380,548, 20 pgs.
USPTO, Final Office Action mailed Aug. 28, 2020, in U.S. Appl. No. 16/380,548, 23 pgs.
USPTO, Final Office Action mailed Nov. 29, 2021, in U.S. Appl. No. 16/380,548, 25 pgs.
EPO, Extended European Search Report mailed Oct. 26, 2021, in EP 19784588.6, 7 pgs.
"Certificate Transparency", https://www.certificate-transparency. org, Mar. 1, 2018, 2 pgs.
"Namecoin", https://en.wikipedia.org/w/index.php?title=Namecoin &oldid=834457487, Mar. 19, 2018, 4 pgs.
"Pretty Good Privacy", https://en.wikipedia.org/wiki/Pretty_Good_ Privacy, Mar. 29, 2018, 10 pgs.
"Public key infrastructure", https://en.wikipedia.org/wiki/Public_ key_infrastructure, Dec. 27, 2017, 6 pgs.
"The difference between a Private, Public & Consortium Blockchain", https://www.blockchaindailynews.com/The-difference-between-a-Private-Public-Consortium-Blockchain_a24681.html, Nov. 14, 2017, 6 pgs.
"Web of trust", https://en.wikipedia.org/wiki/Web_of_trust, Mar. 14, 2018, 6 pgs.
Fromknecht , et al., "A Decentralized Public Key Infrastructure with Identity Retention", Nov. 11, 2014, 16 pgs.
Lewison , et al., "Backing Rich Credentials with a Blockchain PKI", Oct. 24, 2016, 19 pgs.
Nakamoto , "Bitcoin: A Peer-to-Peer Electronic Cash System", www.bitcoin.org, 2008, 9 pgs.
Nystrom , et al., "PKCS #10: Certification Request Syntax Specification, Version 1.7", IETF; Network Working Group; Request for Comments: 2986, Nov. 2000, 15 pgs.
WIPO, International Search Report and Written Opinion received in Application No. PCT/CA2023/050981 on Oct. 10, 2023, 12 pages.
WIPO, International Search Report and Written Opinion issued in Application No. PCT/CA2023/050980 on Sep. 27, 2023, 9 pages.
"How can I verify that a root certificate is authentic?", Information Security, Nov. 11, 2015, https://web.archive.org/web/20160919144449/ https://security.stackexchange.com/questions/105241/how-can-i-verify-that-a-root-certificate-is-authentic, retrieved on Sep. 26, 2023, 3 pages.
"How to check the authenticity of the root cert of some CA?", Information Security, Nov. 20, 2017, https//web.archive.org/web/ 20210126233741/https://security.stackexchange.com/questions/ 164816/how-to-check-the-authenticity-of-the-root-cert-of-some-ca, retrieved on Sep. 26, 2023, 6 pages.

* cited by examiner

270

272

274

300

Generate initial block containing root certificates of root CA — 302

Append a signature of the root CA for each root certificate contained in the initial block — 304

Generate an action identifier and a hash of the initial block — 306

Append at least one signature of the root CA to the action identifier and the hash to form an action block — 308

400

Receive an inquiry regarding the validity of a root certificate — 402

Evaluate the root certificate against a cryptographically authenticated database representing the root CA — 404

Provide a determination concerning the validity of the root certificate — 406

500

Generate key pairs of root certificate of root CA — 602

Generate plurality of self-signed root certificates of the root CA — 604

Generate cryptographically authenticated database of the self-signed root certificates — 606

Distribute the cryptographically authenticated database — 608

CRYPTOGRAPHICALLY AUTHENTICATED DATABASE REPRESENTING A MULTIPLE-KEY-PAIR ROOT CERTIFICATE AUTHORITY

CROSS-REFERENCE TO RELATED APPLICATIONS

This patent application claims priority to, and incorporates by reference the entire disclosure of, U.S. Provisional Patent Application No. 63/391,465 filed on Jul. 22, 2022 and titled "Multiple Key Pair Root Certificate Authority".

BACKGROUND

The following description relates to a multiple-key-pair root certificate authority for cryptography systems.

Cryptography systems are used to communicate securely over public channels. For example, some cryptography systems provide confidentiality by encrypting messages, and some cryptography systems provide authenticity through digital signatures. Some cryptography systems operate using public keys, private keys and shared secrets.

DETAILED DESCRIPTION

Figure 1A:
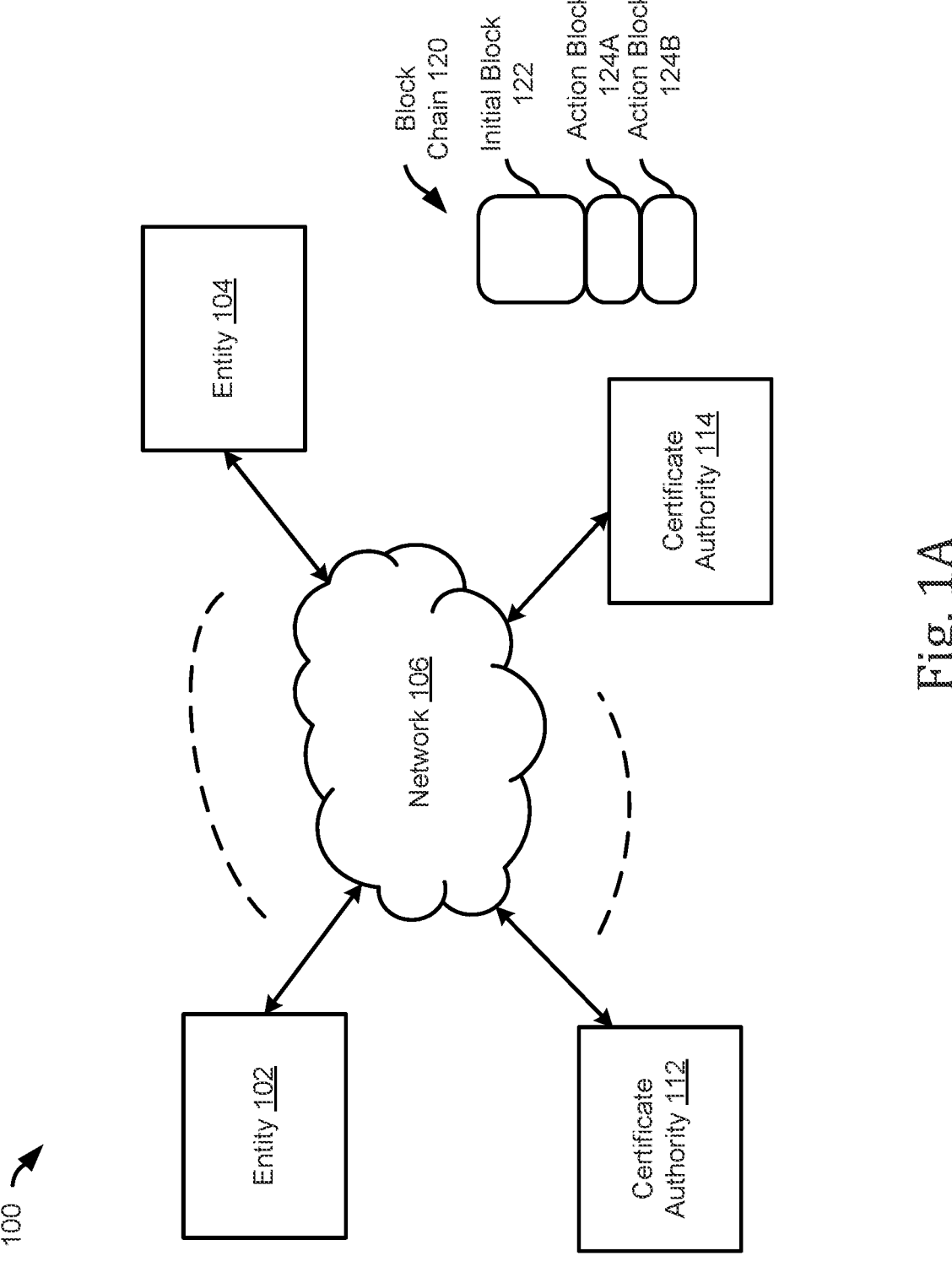
FIG. 1A is a diagram of an example communication system.

In some aspects of what is described here, a cryptography system includes a root certificate authority (root CA) having multiple key pairs. In some instances, implementations of the systems and techniques described here provide technical advantages or improvements over existing technologies. As an example, damage from a compromise of a root certificate authority's private key (e.g., a security compromise arising out of an attack, technical malfunction or other event) can be contained by using a root certificate authority having multiple key pairs. For instance, a root certificate authority with multiple key pairs may provide a protocol or another formal mechanism to revoke the public key corresponding to the compromised private key, or in some cases, to remove the problematic root certificate entirely. As another example, the validity of a root certificate can be modified (e.g., revoked or reinstated), and the validity of a root certificate can be audited and cryptographically verified by other entities in the cryptography system. For instance, a cryptographically authenticated database can provide public proof that a root certificate is valid or invalid. End entities can enquire as to the status of a root certificate, and the root CA can provide cryptographically verifiable status information.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptography systems, for example, making them more secure, more efficient or providing other advantages in some instances.

Public key cryptography is extensively deployed in a variety of technologies to achieve secure authentication, secret key sharing, etc. Using a public key, one can validate a digital signature to verify the identity of the communicating party, or to establish a shared secret to securely encrypt a message. Security provided by public key cryptography typically relies on the received public key being securely bound to a legitimate identity in a trusted manner. Without such secure binding, an entity could unknowingly trust the identity of a malicious party that is impersonating the intended party, or send a message to a wrong recipient who is actually an adversary. Public Key Infrastructure (PKI) systems have been used to establish trust in a public key that it is bound to a legitimate identity.

PKI is currently the most widely deployed mechanism to establish trust in a cryptography system. Conventionally, PKI systems build a hierarchical tree of trust stemming from a trusted entity referred to as a root certificate authority (root CA), presenting itself as a root of trust. In a typical PKI system, a certificate authority (CA) confirms that a public key belongs to an identity, binds the two with a digital signature, and issues the binding in the form of a digital certificate. Any party in the cryptography system (e.g., an end entity) can verify the binding of the public key and an identity by validating the CA's digital signature on the certificate using the CA's public key. Since this validation operation uses the CA's public key, the CA's public key must also be trusted. Therefore, there must be a parent CA that assures that this public key belongs to the CA by issuing a signed certificate. In this manner, the certificates are chained to the Root CA to build trust, and this chain must end somewhere. The last certificate in the chain is the root certificate, which belongs to the root CA. This root CA serves as the root of trust, and it is represented by its certificate, referred to as the root certificate. A root certificate is self-signed because there is no higher third-party CA to provide assurance. Therefore, a root certificate is trusted in a different manner. Typically, methods such as public knowledge or personal communication are used to trust a root certificate.

Traditional PKI systems face certain technical challenges and vulnerabilities. One of the most important vulnerabilities of a PKI system is the root CA because it can be a single point of failure. If the root CA is compromised, it can cause a catastrophic breakdown of security of the entire system. An attacker in possession of a compromised root CA's private key can issue certificates that are verifiable by the root certificate. This means that the attacker can impersonate any entity in the system, potentially causing catastrophic breakdown of security and trust in the entire system. Therefore, a technology platform that provides a root CA with multiple key pairs can provide improved security and efficiency, for example, allowing damage from the security compromise of a single root certificate to be contained or otherwise avoided or mitigated.

Conventional PKI systems may be ill-prepared for the catastrophic failure resulting from the compromise of the root CA's private key, for example, since there is no higher trusted entity than the root CA that has been given power to revoke a root certificate. For instance, a system that does not provide any formal mechanisms to revoke a root certificate or any mechanism for users to identify the no-longer-valid root certificate may be vulnerable. Instead, users of such conventional PKI systems have relied upon public announcements (including, e.g., "optional" software updates) and word-of-mouth to identify compromised root certificates. Thus, a technology platform that allows the establishment of a more systematic method to represent and identify revoked root certificates would provide improved security and efficiency.

In some implementations, root CAs having multiple key pairs can provide technical advantages, for example, over conventional PKI systems. For instance, a multiple-key-pair root CA system can provide a trust mechanism where the validity of a root certificate may be verified against a cryptographically authenticated database representing the root CA. In some examples, a cryptographically authenticated database can include a collection of related and encrypted data that is stored, organized, and accessed electronically via, for example, a database management system. In various implementations, such a database may be hosted, for example, on computer clusters, cloud storage, peer networks, etc. Encrypted databases can provide secrecy and data integrity. Thus, if any past changes are recorded in the database, the change history can be provided. In some cases, it can be proven that the change history and the data are legitimate. Furthermore, if a distributed (redundant) database is used, there will be backups to further establish data validity. In some cases, digital signatures can be applied to the data stored in the database, thus simplifying the process of proving data validity.

One example of such a cryptographically authenticated database is, for example, a cryptographically authenticated chain of data blocks. For purposes of discussion, aspects of the disclosure will be described below as utilizing a cryptographically authenticated chain of data blocks. However, in various implementations, another type of cryptographically authenticated database can be used. For instance, some implementations may utilize another type of database that provides proof of data integrity and authentication by the owner of a secret key, application of data integrity to the stored data and change history, and, when audited, the proof can be provided to at least a trusted third party, preferably to the public. Implementations utilizing a cryptographically authenticated chain of data blocks have the additional advantage that the secret key does not have to be disclosed. Such a feature can provide stronger authentication of the data.

In a system having a root CA with multiple key pairs, a multiple-certificate root of trust can be used, for example, instead of using of a single root certificate associated with a root CA. The multiple-certificate root of trust can be represented with a data set, for example, a chain of data blocks, that contains identities and public keys of multiple root certificates. Because the multiple-key-pair root certificate authority has multiple root certificates, no single root certificate can become a single point of failure. A cryptographically authenticated chain of data blocks representing a multiple-key-pair certificate authority may be published, broadcasted, or distributed (e.g., as a conventional root certificate would be published, broadcasted, or distributed) for use in a cryptography system. The cryptographically authenticated chain of data blocks also allows dynamic changes to the root CA by adding new data blocks to the chain, for example, representing a new certificate or revocation or an existing root certificate, thus providing flexibility and also enabling revocation of root certificates.

In some examples, a root CA that has multiple key pairs (a multiple-key-pair root CA) provides redundancy, as well as the ability to revoke, and to inquire the status of a root certificate. In addition, in some cases, a multiple-key-pair root CA can validate a root certificate with signatures that are not self-signed. In various implementations, a multiple-key-pair root CA uses an authenticated chain of data blocks using digital signatures. In various implementations, the structure of an initial data block and subsequent data blocks can be configured to achieve backwards compatibility for legacy systems, where standard root certificates can be distributed.

In various implementations, a root CA owns multiple key pairs that are controlled and managed independently. Damage resulting from, for example, compromise of a single private key of the root CA, can be contained because there are other private keys of the root CA that are not compromised. Also, the multiple-key-pair root CA provides a mechanism to revoke a certificate corresponding to a compromised key pair of the root CA. Also, the signature verifications of the chain of data blocks provide validation of the bindings of the identity information and associated key pairs (used for validation of root certificates). In various implementations, status inquiry of a public key or certificate of the root CA becomes available. Under each key pair of a root CA, standard certificate chains can be constructed, for example, by one or more subordinate (e.g., intermediate) certificate authorities.

As an overview of an example implementation, a chain of data blocks for a multiple-key-pair root CA may be started from a single initial block. The initial block may be constructed as follows. For example, the root CA has multiple public-private key pairs; a public-private key pair of an entity includes a private key and a corresponding public key, which are related as prescribed by a cryptosystem. The private key is kept as a secret of the entity, while the public key can be published to other entities in the cryptography system. In the case of the root certificate, once the multiple key pairs are established, the combination of an identity and a public key of each key pair is self signed. The self-signed root certificates are then placed into the chain of data blocks. Each data block is then signed by multiple private keys of the root CA. In the case of issuance of a certificate, the private key of a higher CA (either a root CA or a higher intermediate CA) generates the signature. The sets of data for each key pair containing the identity, public key(s), and digital signature(s) of one or more other key pairs are collected to construct a data block. This data block may then be digitally signed by one or more key pairs to ensure its integrity and, to record the evidence of approval. These multiple signatures, and the individual signatures on the identity-public-key combinations, can further contribute to prevent a single point of failure. This signed data block can be the initial block of the chain of data blocks.

Whenever changes occur (e.g., to the certificates contained in the initial block) a new block can be chained. Such changes may include the addition or revocation of a root certificate, or another type of change. A new block containing the information describing changes as data entries, can be appended to the existing chain of data blocks by a cryptographic process, in which the new block of data is concatenated with a hash of the previous block, and the combination is digitally signed (e.g., multiple times). In some implementations, removal of a block from the chain is not permitted, and the blocks are chained in chronological order. Therefore, by tracking the blocks from the latest to older, the current state of the root certificate can be deterministically indicated, allowing an entity to confirm the validity of the public key for an identity.

Damage resulting from compromise of the private key of a root certificate can be contained because such a root certificate is not a single point of failure. For instance, the risk of such a compromise may be limited to the subnetwork underneath the compromised root certificate, and the subnetworks under the other root certificates remain unaffected. Also, the signatures of multiple root certificates can be provided on each block, such that a compromise of a single root certificate is not sufficient to alter the status of other root certificates in the chain of data blocks. This mechanism may also achieve swift revocation of a public key corresponding to a compromised private key or removal of any problematic certificate in a secure systematic manner.

FIG. 1A is a block diagram showing aspects of an example communication system 100. The example communication system 100 shown in FIG. 1A includes four nodes—two entity nodes 102, 104, a root CA node 112, and a second CA node 114. The nodes communicate with each other over a network 106. The communication system 100 may include additional or different features, and the components in a communication system may be configured as shown in FIG. 1A or in another manner.

In some implementations, nodes in the communication system 100 have a server-client relationship. For example, the entity node 102 can be a server and the entity node 104 can be its client in a network, or vice-versa. In some implementations, nodes in the communication system 100 may have a peer-to-peer relationship. For example, the entity nodes 102, 104 can be peers in a network. Nodes may have another type of relationship in the communication system 100.

In the example shown in FIG. 1A, the example entity nodes 102, 104, the root CA node 112, and the second CA node 114 each have computational resources (e.g., hardware, software, and firmware) that are used to communicate with other nodes. For example, each of the nodes in the communication system 100 shown in FIG. 1A may be implemented as the example computer system 500 shown in FIG. 5 or components thereof. In some implementations, the nodes in the communication system 100 can be implemented in various systems, such as, for example, laptops, desktops, workstations, smartphones, tablets, servers, server clusters, mainframes, and other types of computer systems. In some cases, a single device may operate both as an entity node and as a certificate authority node.

In the example shown in FIG. 1A, an end entity (represented by either of the entity nodes 102, 104) or a certificate authority entity (represented by either of the nodes 112, 114) may correspond to a computing device, a computer system, an IP address or other network address, or another type of computer-readable identifier or instance of a computer resource. Accordingly, the computations and other operations of each entity may be performed by one or more processors or other elements of the respective node. Similarly, information sent to or received by an entity may be sent to or received by an element (e.g., one or more processors, memories, or interfaces) of the respective node.

The example network 106 can include all or part of a data communication network or another type of communication link. For example, the network 106 can include one or more wired or wireless connections, one or more wired or wireless networks or other communication channels. In some examples, the network 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In some instances, the nodes shown in FIG. 1A communicate with each other in a secure manner based on a cryptographically authenticated chain of data blocks that includes an initial block and possibly a chain of one or more blocks chained to the initial block. For instance, the nodes may utilize a cryptography system or another type of system where trust is established based on the example cryptographically authenticated chain of data blocks 120. The example cryptographically authenticated chain of data blocks 120 shown in FIG. 1A includes an initial block 122 and two action blocks 124A, 124B. The first action block 124A is chained to the initial block 122, and the second action block 124B is chained to the first action block 124A.

Figure 2A:
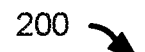
FIG. 2A is a diagram of an example initial block of a cryptographically authenticated chain of data blocks associated with a root certificate authority.
Figure 2A:
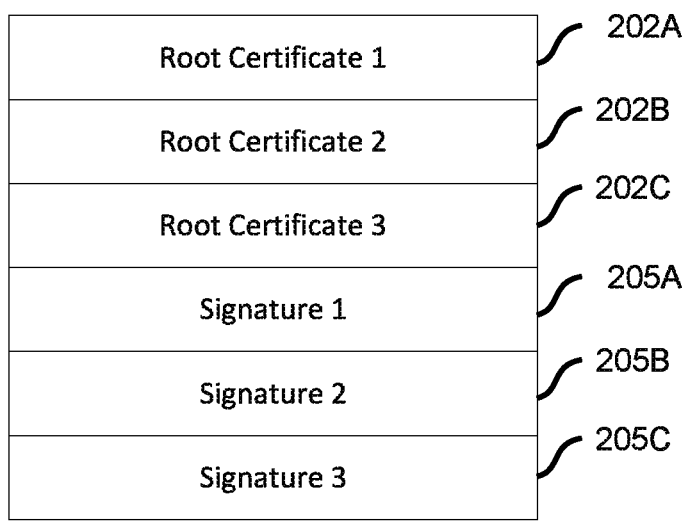
Figure 2B:
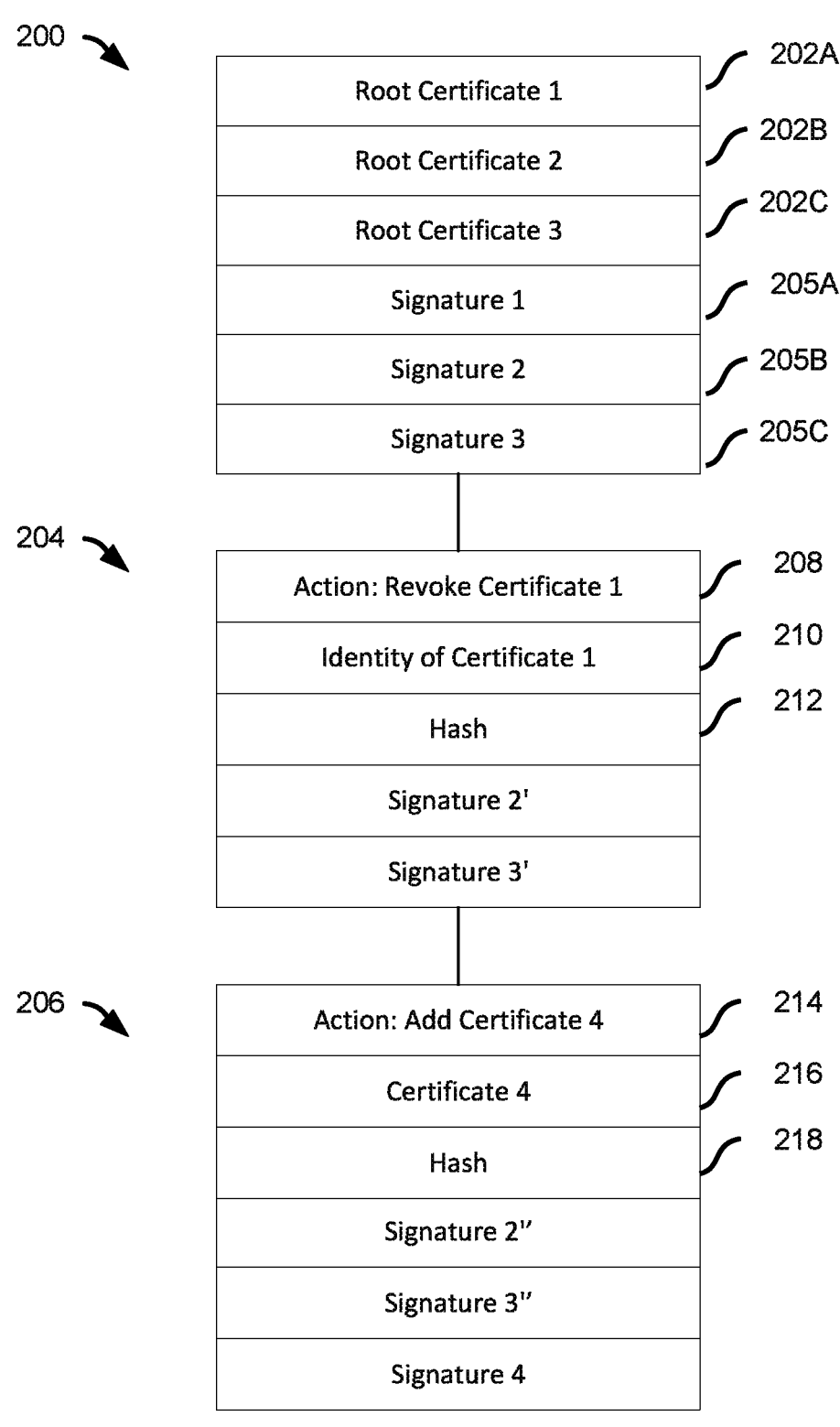
FIG. 2B is a diagram of a cryptographically authenticated chain of data blocks illustrating the example initial block of FIG. 2A and example action blocks.

Generally, a cryptographically authenticated chain of data blocks may include only the initial block 122, or may include any number of action blocks 124. The initial block 122 is the first block in a chain that is generated by the root CA node 112 and contains multiple root certificates owned by the root CA, and the action blocks 124A, 124B represent changes related to the cryptographically authenticated chain of data blocks 120 or root certificates contained therein. An example initial block is shown in FIG. 2A; example action blocks are shown in FIG. 2B. The cryptographically authenticated chain of data blocks 120 may include additional or different types of blocks in some cases.

In some implementations, the root CA node 112 may issue digital certificates based on the cryptographically authenticated chain of data blocks 120. As an example, the root CA node 112 may represent a root CA that owns multiple key pairs, which are included in the cryptographically authenticated chain of data blocks 120 (e.g., in the initial block 122 or in one of the action blocks 124A or both), and the root CA 112 may issue digital certificates that can be validated using one of the public keys in the cryptographically authenticated chain of data blocks 120. Accordingly, other entities may use the cryptographically authenticated chain of data blocks 120 to establish trust in digital certificates issued by the root CA node 112. In some implementations, the second CA node 114 may be, for example, a subordinate CA (e.g., an intermediate CA) that is trusted by other entities based on a digital certificate issued by the root CA node 112.

In some cases, the entity nodes 102, 104 use a digital signature scheme that allows each node to validate the authenticity of messages received from the other node. The digital signature scheme can be, for example, an elliptic curve cryptography (ECC) based signature scheme, an RSA-based signature scheme, a lattice-based signature scheme, a hash-based signature scheme, a supersingular isogeny-based signature scheme, a multivariate signature scheme or a scheme that uses another type of cryptography. When a digital signature is verified using the signer's public key, the verifier may establish trust in the signer's public key based on the cryptographically authenticated chain of data blocks 120.

In some cases, the entity nodes 102, 104 use an encryption scheme that allows each node to send confidential messages to the other nodes. The encryption scheme can be, for example, an elliptic curve cryptography (ECC) based encryption scheme, an RSA-based encryption scheme, a lattice-based encryption scheme, a supersingular isogeny-based encryption scheme, a code-based encryption scheme or a scheme that uses another type of cryptography. When a message for a recipient is encrypted using the recipient's public key, the sender may establish trust in the recipient's public key based on the cryptographically authenticated chain of data blocks 120.

Figure 1B:
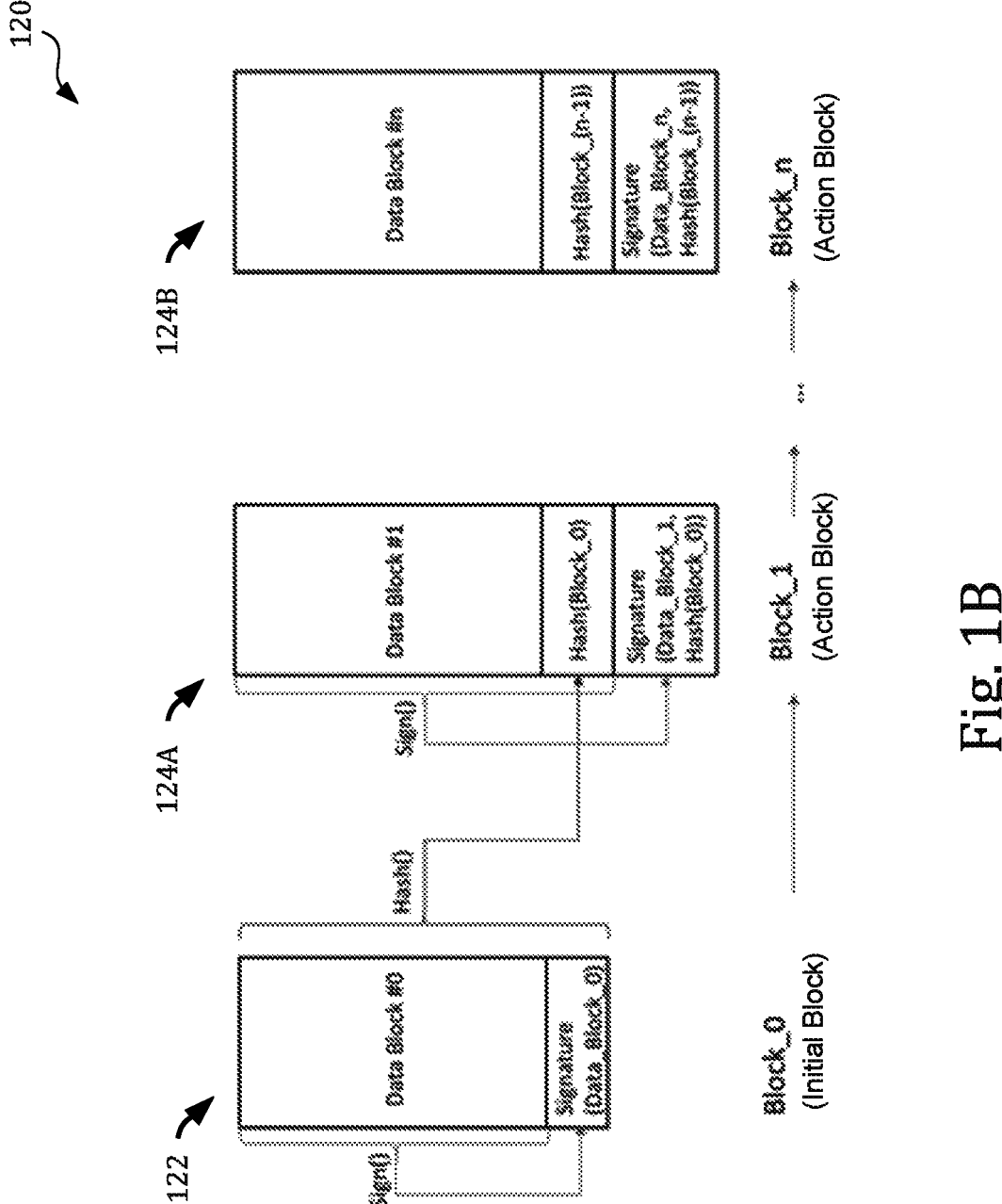
FIG. 1B is a diagram showing aspects of the example cryptographically authenticated chain of data blocks 120 in FIG. 1A.

FIG. 1B is a diagram of an example cryptographically authenticated chain of data blocks that can be used as the cryptographically authenticated chain of data blocks 120 in FIG. 1A. The example cryptographically authenticated chain of data blocks represented in FIG. 1B includes blocks chained in sequence. In the example shown in FIG. 1B, the chain of data blocks is started with an initial block 122, which is the first block of the chain ("Block_0"). The example initial block 122 includes a data block ("Data Block #0"), and a digital signature for the data block. In the process of forming each new block for the chain, a hash of the previous block in the chain is computed by applying a hash function to the previous block; and the hash is appended to the new data block. As shown in FIG. 1B, the action block 124A ("Block_1") is chained from the initial block 122; the action block 124A includes a new data block ("Data Block #1") and a hash of the prior block (Hash(Block_0)). The hash of the initial block 122 is generated by computing Hash(Block_0). Here, Hash(.) represents an output hash value generated by applying a cryptographic hash function to an input value (e.g., "Block_0"). In some implementations, one or more conventional hash functions in the SHA-2 family (e.g., SHA-256, SHA-512, SHA-384) or SHA-3 family can be used. Additional or different hash functions may be used.

In the process of forming each new block for the chain, a digital signature of the new data block and the hash of the prior block is generated; and the digital signature is appended to the new data block and the hash of the prior block. As shown in FIG. 1B, a digital signature is generated based on the concatenation of the new data block ("Data Block #1") and the hash (Hash(Block_0)), and the digital signature is appended to form the action block 124A. Typically, a digital signature is generated by a digital signature algorithm operating on inputs that include a private key of the signing entity and a message to be signed (e.g., the data block and the hash shown in FIG. 1B.). The digital signature may be generated according to any suitable digital signature algorithm (e.g., RSA, DSA, ECDSA, lattice-based digital signature algorithms, etc.).

Each subsequent block of the chain may be generated using a similar process. As shown in FIG. 1B, an action block 124B ("Block_n") is chained from the prior block ("Block_(n−1)"), and the action block 124B includes a new data block ("Data Block #n") and a hash of the prior block. Also shown in FIG. 1B, a digital signature is generated based on the concatenation of the new data block ("Data Block #n") and the hash ("Hash(Block_(n−1))"), and the digital signature is appended to form the action block 124B.

In the example shown in FIG. 1B, the hash of the previous block unambiguously specifies the link between two blocks (e.g., initial block 122 and action block 124A), and the digital signature ensures the integrity of the new block and the link from the previous block. As shown by the examples in FIGS. 2A and 2B and the related discussion below, the type of data structure and methodology represented in FIG. 1B for building a chain of data blocks may be used as a basis to construct a cryptographically authenticated chain of data blocks that represents a multiple-key-pair root CA.

Figure 1C:
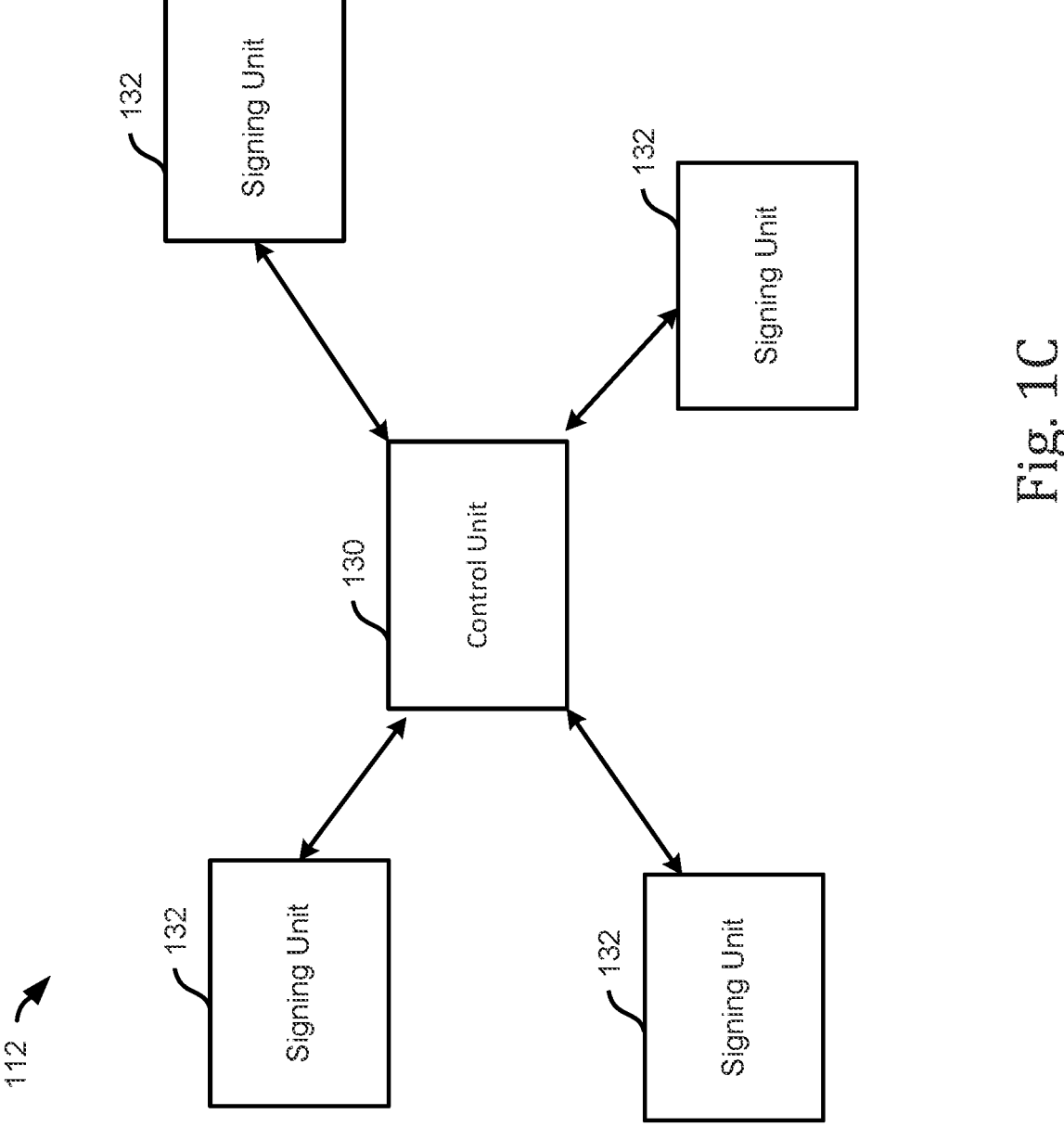
FIG. 1C is a block diagram of an example computer system of a root certificate authority.

FIG. 1C is a block diagram of an example computer system 128 of a root CA having a control unit 130 and multiple signing units 132. For instance, the example computer system 128 shown in FIG. 1C may perform one or more operations of the root CA 112 shown in FIG. 1A. The computer system 128 may include additional or different components, and the components may be arranged in another manner. In the example shown, the computer system of the root CA includes a central control unit 130 and multiple signing units 132 connected as a star network with the control unit 130 in the center; each signing unit 132 is connected only to the control unit 130. A signing unit 132 owns a private key, and produces a digital signature upon request from the control unit 130. Each signing unit 132 maintains its own state, which can represent the current state of the cryptographically authenticated chain of data blocks. In some implementations, the control unit 130 and the signing units 132 can be implemented as a set of software processes on a single computing device such as, for example, Integrated Circuit (IC) chips on a circuit board, independent circuit boards in a hardware box such as a rackmount blade unit, or as separate computing devices.

Typically, the computer system 128 can be constructed on a Hardware Security Module (HSM), which is usually a rackmount blade unit. Therefore, multiple HSMs may be used to construct the multiple-key-pair root CA. Alternatively, within a rackmount blade unit, control units 130 and signing units 132 may be implemented as separate circuit boards connected on the system bus. It is possible to implement these units as software modules in an HSM, and protections can be deployed to ensure the independence of the signing units for security. The connections between the control unit 130 and the signing units 132 can be secured against modification and impersonation, and eavesdropping concerns can be avoided since no secret information is being communicated.

In various embodiments, the root CA 112 owns multiple key pairs. The private keys are stored and managed independently. The public keys and the associated identity information are stored and managed in the form of a cryptographically authenticated database, which in various implementations may be a chain of data blocks. The use of the cryptographically authenticated database captures changes in the key pairs such as update, replace, revoke, add, etc. with cryptographic authentication and integrity.

In conventional PKI systems where a root CA owns a single key pair, an identity of a root CA is equivalent to an identity of the root CA's key pair. However, since the example root CA 112 shown in FIG. 1A owns multiple key pairs, each key pair is distinguished. Therefore, each key pair is identified by the combination of the identity of the root CA 112 and the identity of the key pair belonging to this root CA 112. In the data blocks, a public key is associated with the combination of the root CA identity and the key pair identity.

The chain of data blocks 120 captures the identity and public keys of the root CA 112; the public keys are distinguished by the identity of the key pair and can be represented in various manners in the cryptographically authenticated database. Examples of representations of public keys include:

1. Represent in the minimum amount of data;
2. Variant of representation 1 with more self-contained representation;
3. Represent as a set of standard digital certificates without signature;
4. Represent as a set of self-signed certificates;
5. Represent as a set of standard digital certificates signed by different private key than the private key that is paired with the public key in the certificate;
6. Represent as a set of multiple cryptosystems certificate; and
7. Represent as a set of self-signed certificates with signatures by other private keys are stored in the alternative cryptosystems extension.

If minimizing the size of data blocks in the cryptographically authenticated database (i.e., Representation 1) is preferred, the initial block (e.g., the initial block 200 shown in FIG. 2A) may contain the identity of the root CA 112 and a list of pairs of the public key and its associated key pair identity. The subsequent data blocks may omit the identity of the root CA 112. In such a case, in order to obtain the root CA identity, tracing the chain to the initial block 200 may be needed.

Alternatively, an identity of a key pair may always contain an identity of the root CA 112. This may be preferred if self-contained representation of a key pair (i.e., Representation 2) is desired. Note that in both Representation 1 and Representation 2, it is important to contain sufficient information to derive a representation in the form of the main body of a digital certificate (e.g., a digital certificate without signature).

The representation of a key pair identity including the root CA 112 identity and public key may take the form of digital certificate without signature (e.g., the main body of a digital certificate (i.e., Representation 3)). Then, the data blocks may be comprised of a list of digital certificates without signatures.

In some implementations, the representation can use a complete standard self-signed digital certificate (i.e., Representation 4). This representation can provide backwards compatibility for the legacy systems. Instead of providing the chain of data blocks, self-signed digital certificates can be distributed to the end entities. In such a deployment, the end entity can perform validation of root certificate as discussed hereinbelow.

Instead of using a self-signed certificate format, a representation using a standard certificate that is signed by a private key that is different from the private key that corresponds to the public key in the certificate (i.e., Representation 5). This may be useful when the root CA 112 owns only a small number of key pairs such as, for example, two key pairs, corresponding to two certificates. Such a pair of certificates may be distributed to the end entities instead of the chain of data block to serve as a root certificate. They are not self-signed but the signature can be verified using the other certificate. In various implementations, where the root CA 112 owns a larger number of key pairs, there may be many combinations of pairs of certificates, where the number of such certificate pairs may be much larger than the number of key pairs, requiring a large number certificates.

Using the X.509 extension of the additional cryptosystems, the number of certificates can be reduced. The public keys and the additional signatures from the different private keys may be stored in the extension (i.e., Representation 6). The same number of certificates as the number of key pairs may be required in such cases.

A variant of Representation 6 is to contain a self-signed signature in the normal location of the signature, and to store other signatures in the extension (i.e., Representation 7). In this manner, backwards compatibility similar to Representation 4 is achieved, through which mutual verifications by different key pairs are also available.

In some implementations where the cryptographically authenticated database is a chain of data blocks, a chain of data blocks starts with an initial data block containing an initial set of data containing the identity of the root CA, the public keys of the root CA, and the identities of the public keys. The initial set of data may be provided, for example, as a collection of self-signed digital certificates. This initial set of data can be digitally signed to authenticate and ensure integrity, and the signatures are appended to complete the initial data block. Any changes of the key pairs of the root CA 112 can be captured in the subsequent data blocks. A subsequent data block can be chained by taking the hash of the previous data block including the appended signatures, the concatenation of the message digest with the set of data for the new data block, digitally signing the concatenation, and appending the signatures to the concatenation to complete the new data block.

In some implementations, the root CA may build the initial data block in the following manner:

1. The root CA generates multiple key pairs.
2. The main body of the initial data block containing the identity of the root CA, the identities of the key pairs, and the public keys is constructed.
3. This main body of the initial data block is signed using the private keys associated with the multiple key pairs generated by the root CA.
4. The signatures are appended to the main body to complete the initial data block.

The example initial block 200 shown in FIG. 2A includes an array of root certificates 202A, 202B, 202C that form the initial data block 200. The root certificates 202A, 202B, 202C correspond to the key pairs owned by the root CA. Each root certificate corresponds to a respective one of the root CA's key pairs. In the example shown, there are three root certificates (Root Certificate 1, Root Certificate 2, Root Certificate 3,); however, in other implementations, the initial block 200 may include any number of root certificates. In the example shown in FIG. 2A, each of the root certificates 202A, 202B, 202C is self-signed, meaning that the root certificate contains a digital signature generated by signing the CA's public key (and additional data elements) with the CA's corresponding private key.

In the example shown in FIG. 2A, the initial block 200 also includes a digital signature 205A, 205B, 205C corresponding to each of the root certificates present in the initial block 200. The digital signatures are generated by private keys associated with each root certificate. In some cases, a digital signing protocol can be applied to an input message that includes the array of root certificates 202A, 202B, 202C. For example, Signature 1 may be generated using the private key associated with the public key in Root Certificate 1; Signature 2 may be generated using the private key associated with the public key in Root Certificate 2; and Signature 3 may be generated using the private key associated with the public key in Root Certificate 3.

In some aspects of operation, the plurality of distinct root certificates 202A, 202B, 202C are obtained from the signing units 132 of the root CA 112. Each signing unit 132 applies its digital signature associated to the initial block 200. The control unit 130 can then validate the digital signatures in the initial block 200 before providing the initial block 200 for use in the cryptography system.

After the initial block 200 is created, additional data blocks in the chain may be constructed. Valid identities and public keys of the root CA 112 can be represented by a chain of data blocks stemming from the initial block 200, where any changes to the root CA 112, e.g., additions or revocations of certificates, are recorded by the chained blocks. As shown in FIG. 2B, a single block is added to the prior block of the chain at a time, creating a single thread chain. For instance, the chain of data blocks can be deployed as an append-only chain, where no removal of a block from the chain is permitted. This means that the blocks are chained in a chronological order, where the last block is the latest. Therefore, in order to verify a root certificate of the root CA 112, one can trace the chain from the last block to find the first (e.g., latest) appearance of this certificate's identity to determine the validity of the root certificate and to find a valid public key, if the root certificate is valid, and to use the public key to validate the signature. Thus, the chain of data blocks contains validity information representing validity or invalidity of each of the plurality of distinct root certificates 202A, 202B, 202C.

The initial block 200 and chained blocks may have different data structures of their respective data blocks. In some cases, the data structure of the initial block 200 and the chained data blocks may have certain fields in common, e.g., an identity field, a public key field, and a signature field. In some cases, aspects of the initial block 200 and the chained data blocks may resemble or contain one or more X.509 certificates, or another digital certificate format. For instance, the format and encoding of X.509, or another digital certificate, may be used to represent this part of a data block, although more straightforward encoding can be used as well. However, in some cases, unlike X.509, multiple signatures may be applied to the data block.

In some implementations, an identity field includes identity information data regarding an entity. A public key data field may have a data structure comprising components including, for example, a cryptosystem with domain parameters that the public key belongs to, a public key, and an expiry date, that in some cases, may include a time of expiry or other representation of time, e.g. duration. A digital signature data structure may include components, including, for example, an identity of a signer, a cryptosystem with domain parameters that the signature is generated over, a digital signature, and a time stamp.

FIG. 2B is a diagram of the initial block 200 with subsequent data blocks chained to it. As shown in FIG. 2B, any change to the information in the initial block 200 (e.g., changes in the validity of a root certificate, the addition of a new digital certificate, etc.) will be captured in subsequent data blocks. When a change occurs, a new data block can be created. The new data block can be generated in the following manner:

1. The previous block is hashed;
2. The produced message digest is concatenated with the main body of the new block;
3. The concatenated data is signed; and
4. The signatures are appended to the concatenated data to complete the chaining of the new data block.

In some implementations, the control unit 130 is utilized to store and maintain the chain of data blocks. The chain of data blocks can serve as a cryptographically authenticated database.

FIG. 2B illustrates a first action block 204 and a second action block 206; however, any number of action blocks may be included depending on the events or the actions taken. By way of example, the first action block 204 specifies that Root Certificate 1 is to be revoked. Such an action may be taken responsive to, for example, compromise of the private key associated with Root Certificate 1, expiration or Root Certificate 1, or any other scenario that could warrant revocation of a root certificate. The first action block 204 includes a first data field 208. The first data field 208 contains a description of the action to be taken. The first action block 204 also includes a second data field 210, which contains an identity of the root certificate being acted upon. In the example, illustrated in FIG. 2B, the second data field 210 includes the identity of Root Certificate 1. The first action block 204 also includes a hash 212. The hash 212 specifically links the action block to the previous block in the chain. In the example illustrated in FIG. 2B, the hash 212 links the first action block 204 to the initial block 200. Finally, the first action block 204 includes a plurality of digital signatures. In various implementations, the plurality of digital signatures includes the digital signature generated by a private key associated with each valid root certificate (e.g., each non-revoked root certificate contained in the initial block). Thus, in the case of the first action block 204, the digital signatures generated by the private keys associated with Root Certificate 2 and Root Certificate 3 are attached. A digital signature generated by the private key associated with the Root Certificate 1 is not attached because an action to revoke root certificate 1 is undertaken by the first action block 204. The digital signatures (Signature 2', Signature 3') are generated by signing a message that includes the data fields 208, 210 and the hash 212. In this manner, the digital signatures (Signature 2', Signature 3') can be used to cryptographically verify the validity or invalidity of the root certificates 202A, 202B, 202C.

The second action block 206 specifies that Root Certificate 4 is to be added as a valid root certificate. Similar to the above, the first data field 214 includes a description of the action to be taken, namely, add Root Certificate 4. The second data field 216 contains the self-signed certificate corresponding to Root Certificate 4. The hash 218 links the second action block 206 to the previous block in the chain, which, in this case is the first action block 204. Finally, the second action block includes digital signatures generated, respectively, by the private keys associated with Root Certificate 2, Root Certificate 3, and Root Certificate 4. The digital signatures (Signature 2", Signature 3", Signature 4") are generated by signing a message that includes the data fields 214, 216 and the hash 218. In this manner, the digital signatures (Signature 2", Signature 3", Signature 4") can be used to cryptographically verify the validity or invalidity of the root certificates of the root certificate authority.

In some implementations, the control unit 130 builds the main body of the action blocks. If it involves a new public key, the action block contains the new public key and the identity of the key pair that this public key belongs to. The control unit 130 assigns a signing unit 132 for the new key pair and constructs the main body of the action block in a similar manner as generation of the initial data block 200. For example, if Representation 4 (the representation by self-signed certificate) is used, the central control unit forms the main body of the self-signed certificate and has it signed by the corresponding signing unit. If Representation 5 or 6 (signed certificate) is used, the control unit 130 has the other signing units 132 sign the main body of the root certificate. Some actions of the control unit 130 may be assigned to the signing unit 132.

To revoke or remove a public key, having the identity of the key pair that the public key belongs to in the new data block may suffice. However, the public key itself may also be included. Other changes and actions may be captured with the appropriate information in the main body of the new data block. In some implementations, the new data block may contain an entire certificate revocation list ("CRL") including signature.

When adding an action block, and the previous data block is hashed, the control unit 130 may perform the hashing and send the message digest along with the main body of the action block to the signing units 132. The signing unit 132 may hash its state, which can include the previous data block, to confirm the correctness of the received message digest. Alternatively, the control unit 130 may merely send the main body of the action block and each signing unit 132 may hash its state, concatenate the message digest, generate the signature and send it back to the control unit 130. In such a case, the control unit 130 may also hash the previous block, concatenate it with the main body, and may verify the received signature to confirm that the signing units 132 have correct states and performed appropriate signature generation. The signatures can be appended to the concatenation of the message digest and the main body to complete the action block. This completes the chaining process. The new data block is sent to the signing units 132 where they update the state with the new data block. The action block may also be distributed to the end entities.

Figure 2C:
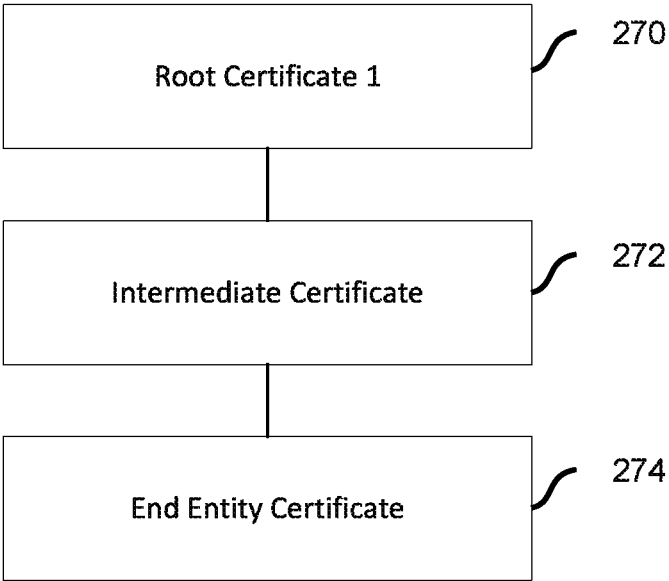
FIG. 2C is a diagram of a certificate chain stemming from a root certificate of the example initial block of FIG. 2A.

Possible action types (and associated action-type identifiers) that can be identified in a data entry in FIG. 2C include: adding a new root certificate ("new"); revoking a root certificate ("revoking"); canceling an old public key ("cancel"); timestamp ("timestamp"); known status ("status"); freeze ("freeze"), unfreeze ("unfreeze"); and possibly others.

In some cases, other types of actions may be defined and utilized. Examples of how the action types listed above may be defined and utilized will now be described. These and other action types may be implemented in another manner.

The action of "new" is used to add a key pair or a root certificate. For example, this action indicates that this root certificate or key pair did not exist in root CA 112. Thus, a new identity along with its associated public key appears in a data entry.

The action of "update" is used when a public key is about to expire. Thus, this action enables a grace period where the two public keys of the same cryptosystem with the same security strength co-exist for an identity until the old one expires. The updated public key can be specified in the data entry.

The action of "replace" is used when a public key has been revoked. The owner of the revoked public key can replace the revoked public key with a replacing public key. The replacing public key can be specified in the data entry.

The actions of "revoke" prompts immediate invalidation of the public key. The revoked public key is specified in the data entry. Once a public key is revoked, owner of this public key may be reactivated by the "replace" action.

The action of "add" allows for adding a second public key for an existing identity, for example, creating a situation where a member owns two valid public keys simultaneously. This can be useful in a migration scenario, where the second public key belongs to a different cryptosystem, or to the same cryptosystem but with a different security strength.

The second public key is for the new cryptosystem, or the security strength, or both, that the system is migrating to.

The old public key in the migration initiated by the "add" action can be deactivated by the "cancel" action. In some implementations, "revoke" may be used to indicate this "cancel" action.

The "timestamp" action may be used to indicate that the chain is up-to-date and was correct at the published time and date. A root CA would be free to choose a suitable interval to publish "timestamp" blocks. In some implementations, the absence of recent "timestamp" blocks in the published chain could be interpreted by a client as an indication that the latest blocks of the chain have been withheld or not published.

The "status" action may contain all valid self-signed root certificates of the root CA. Such a block may be redundant, as it contains information that is calculable from earlier blocks. A "status" block can be considered as an intermediate initial block. Consumers (especially on constrained devices) could validate a status block when received. Future chain validation would work from the current end of the chain to a previously validated status block allowing a reduction in work required to verify trust. The entire chain would still be available for cases where complete validation was desired. In some implementations, a "status" block may contain self-signed root certificates that are valid at the moment.

The "freeze" action is optional. This action indicates that a new block will not be updated, i.e., no actions will be taken, for a certain amount of time. Thus, this action block must associate the time period, or the expiration time, of the frozen period. Also, optionally, no time may be specified, indicating that the chain of data block is frozen indefinitely. This can be used to terminate the chain, for example.

The "unfreeze" action is optional. This action is used only when accidental or malicious use of "freeze" action is detected. This action can undo such a "freeze" action.

In some implementations, the action types introduced above for managing root certificates and public keys provides functionality to migrate to a new cryptosystem accomplishing cryptographic agility. For example, when migration of a public key algorithm from an old one to a new one is needed, the action types allow for the fast addition of a second public key for a new identity, creating a migration period, and a defined method to revoke the old public key later on, when migration is complete.

FIG. 2C is a diagram of a certificate chain stemming from a root certificate of the initial block 200. As illustrated in FIG. 2C, a root certificate 270 contained in the chain of data blocks may serve as a trusted anchor for an intermediate certificate 272 and an end entity certificate 274. In various implementations, the root certificate 270 may be, for example, the root certificates 202A, 202B, 202C, 216 illustrated in FIGS. 2A and 2B. The intermediate certificate 272 can be issued to an intermediate CA by the root CA; for example, the intermediate certificate can include the digital signature of the root CA (generated using the root CA's private key associated with the root certificate 270) on the identity and public key of the intermediate CA. The end entity certificate 274 can be issued to an end entity by the intermediate CA; for example, the intermediate certificate can include the digital signature of the intermediate CA (generated using the intermediate CA's private key associated with the intermediate certificate 272) on the identity and public key of the end entity.

In the multiple-key-pair root CA 112, the chain of data blocks 120 allows the root certificates to be validated. The chain of data blocks may be distributed to the verifying end entities. The verifying end entities can validate the chain of data blocks 120 by verifying the signatures in the chain using the public keys in the chain. In some cases, different public key than the target public key may be used for signature verification.

In some implementations, the initial data block 200 is distributed first (instead of distributing the root certificate 270 by itself). Then, the public keys of the root CA 112 can be updated by distributing the action blocks (204, 206). The action blocks (204, 206) can be validated by confirming that the message digest in the action block (204, 206) matches to the hash of the previous data block and verifying the signatures on the action block (204, 206). The action blocks (204, 206) are signed with multiple private keys of the Root CA. This means that when the action block (204, 206) calls for revocation of a root certificate, the revocation is cryptographically authenticated using public keys contained in the chain of data blocks that are different from the target public key. The distribution of the initial data block 200 and the subsequent action blocks (204, 206) may take advantage of the existing method to distribute root certificates, via OS update, etc. However, the verification end entities may need to perform different checking and handling of them than root certificates.

As mentioned above, a public key with its identity can be represented in the form of a digital certificate. When the representation of a self-signed certificate, Representations 4 and 7, is used, it can accomplish backwards compatibility. The root CA 112 distributes standard self-signed certificates, which are contained in the chain of data blocks, instead of the chain of data blocks being distributed to the legacy verifying end entities requiring backwards compatibility. Then, the legacy verifying end entity can perform standard certificate chain validation. The existing method to update the root certificate can be used to a provide new public key.

In some implementations, a legacy end entity may occasionally or periodically validate the root certificate that it owns. In such a case, the legacy end entity can fetch or download the latest chain of data blocks, confirm that the root certificate is in the chain of data blocks, confirm that the root certificate remains valid, and confirm that the chain of data blocks is valid, which is to verify the signatures in the chain with the public keys in there.

In some cases, the root CA 112 may distribute its public keys in the form of digital certificates that are not self-signed but are otherwise in the standard format. This is Representation 5 or 6 discussed above. Since these certificates are not self-signed, they can be mutually validated with proper signature verifications. Again, by downloading the chain of data blocks and verifying the signatures therein, the certificates of the root CA can be validated.

The root certificates can be validated in a manner similar to Online Certificate Status Protocol (OCSP) or Certificate Revocation List (CRL). If the root CA is the responder of OCSP, the OCSP Response can be signed using a private key that is not paired with the inquired public key. A CRL can be signed using a private key that is not revoked. In both cases, multiple signatures from different valid private keys can be applied to a OCSP Response or CRL.

Figure 3:
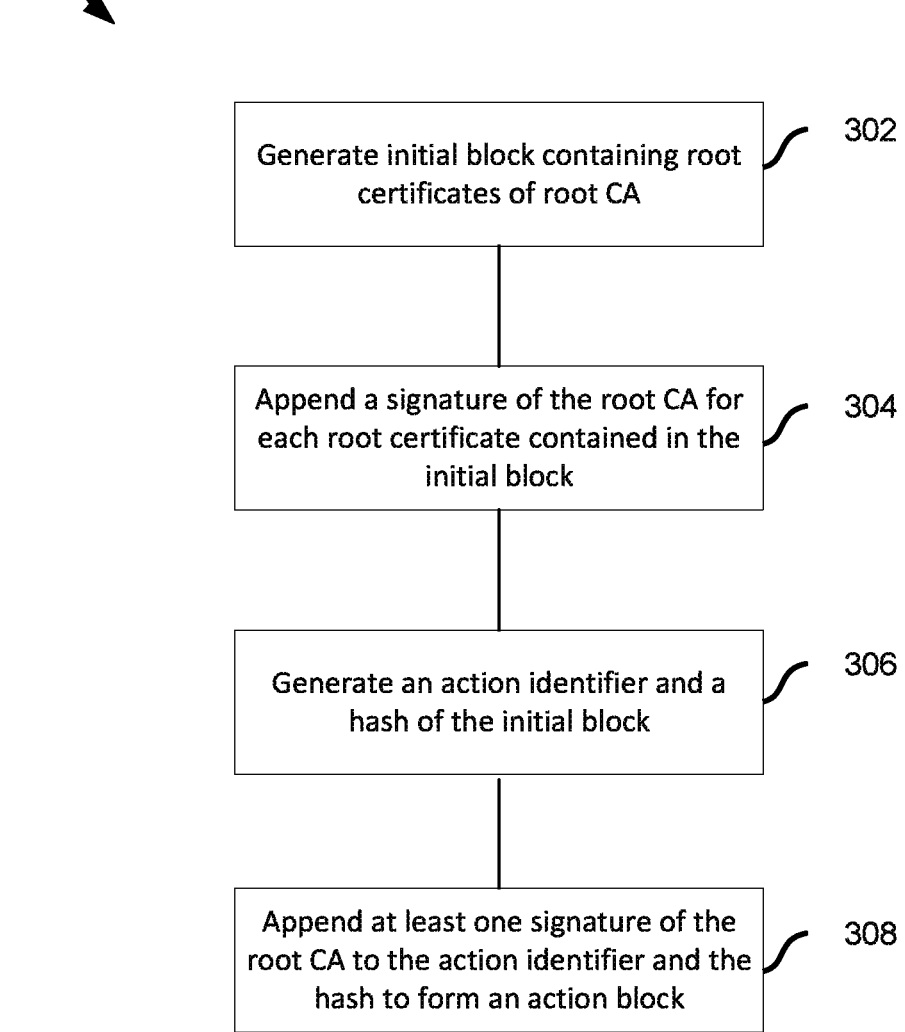
FIG. 3 is a diagram illustrating an example process for generating a cryptographically authenticated chain of data blocks.

FIG. 3 is a diagram illustrating an example process 300 for generating a cryptographically authenticated chain of data blocks. For example, the process 300 may generate the example chain of data blocks 120 shown in FIG. 1, the example chain of data blocks shown in FIGS. 2A and 2B, or another cryptographically authenticated chain of data blocks. The example process 300 can be performed by a computer system, for example, by a computer system associated with the root CA 112 shown in FIG. 1A or another computer system. In some cases, one or more operations in the process 300 can be performed by the example computer system 128 shown in FIG. 1C. The example process 300 may include additional or different operations, and the operations may be performed in the order shown or in another order. In some cases, one or more of the operations shown in FIG. 3 are implemented as processes that include multiple operations, sub-processes, or other types of routines. In some cases, operations can be combined, performed in another order, performed in parallel, iterated or otherwise repeated, or performed another manner.

At 302, the control unit 130 constructs the initial data block with the help from the signing units 132, which perform key pair generation and digital signature generation. First, each signing unit 132 generates initial key pairs. Then, the signing unit 132 sends the public key to the control unit 130. In cases where these are the actions within the root CA 112, the root CA 112 knows that each signing unit 132 owns its private key. In such cases, there is no need for a Certificate Signing Request (CSR) type exchange to prove the possession of the private key.

Next, the control unit 130 creates the main body of the initial block 200 containing the identity of the root CA 112, identities of the initial key pairs, and the initial public keys. If the representation of a self-signed certificate is used, the control unit 130 forms the bodies of self-signed certificate and has them signed by the signing units 132. The control unit 130 may construct the identity information, send it to the signing units 132, and have them complete with the public keys. In this case, the signing units 132 may return self-signed certificates to the control unit 130. Alternatively, the control unit 130 may construct the data to be self-signed after receiving the public keys from the signing units 132. In this case, the signing units 132 may send only the signatures back to the control unit 130, where the control unit 130 may complete the self-signed certificates. After this, the control unit 130 concatenates the self-signed certificates to construct the main body of the initial block (e.g., the initial block 200 shown in FIGS. 2A and 2B).

At 304, once the control unit 130 constructs the main body of the initial data block, it sends the main body to the signing units 132 to obtain the signatures. Then the control unit 130 appends the signatures to complete the initial data block. The control unit 130 sends the completed initial data block to the signing units 132, where the signing units 132 store it as their initial state. The initial data block may also be distributed to the end entities, where different representation can be used as discussed above. The distribution method is further described with respect to FIG. 2C. The signing units 132 may perform some of the operations by the control unit 130 in various implementations.

At 306, to add an action block, first the previous data block is hashed. The control unit 130 may perform the hashing and send the message digest along with the main body of the action block to the signing units 132. Each signing unit 132 may hash its state, which can be or include the previous data block, to confirm the correctness of the received message digest. Alternatively, the control unit 130 may merely send the main body of the action block and each signing unit 132 may hash its state, concatenate the message digest, and generate the signature and send it back to the control unit 130. In such a case, the control unit 130 may also hash the previous block, concatenate it with the main body, and may verify the received signature to confirm that the signing units 132 have correct states and performed appropriate signature generation.

At 308, the signatures are appended to the concatenation of the message digest and the main body to complete the action block. In some cases, this completes the chaining process. The action block is sent to the signing units 132 where they update their state with the action block. The action block, or the updated chain of data blocks, may also be distributed to the end entities.

Figure 4:
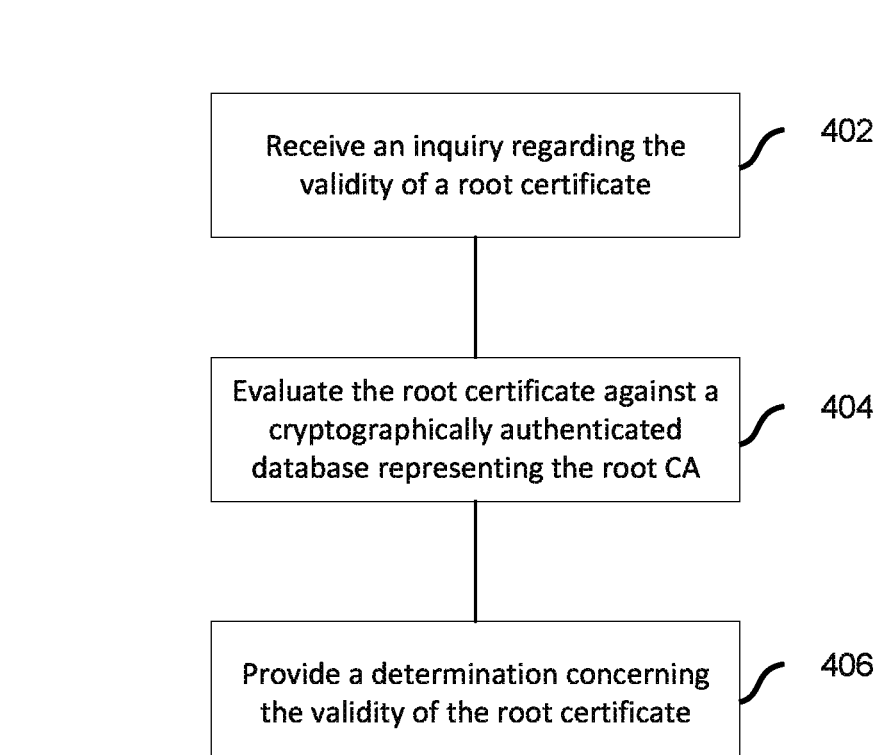
FIG. 4 is a diagram illustrating an example process for validating a root certificate.

FIG. 4 is a diagram illustrating an example process 400 for validating a root certificate For example, the process 400 may validate one of the root certificates 202A, 202B, 202C, 216 shown in FIG. 2B, or a root certificate in another cryptographically authenticated database. The example process 400 can be performed by a computer system, for example, by a computer system associated with the root CA 112 shown in FIG. 1A or another computer system. In some cases, one or more operations in the process 400 can be performed by the example computer system 128 shown in FIG. 1C. The example process 400 may include additional or different operations, and the operations may be performed in the order shown or in another order. In some cases, one or more of the operations shown in FIG. 4 are implemented as processes that include multiple operations, sub-processes, or other types of routines. In some cases, operations can be combined, performed in another order, performed in parallel, iterated or otherwise repeated, or performed another manner.

At 402, an inquiry regarding the validity of an identified root certificate is received. In some implementations, the identified root certificate may be the root certificate 1 (202A) illustrated in FIGS. 2A-2B or another root certificate. In various implementations, the identified root certificate may be contained in an initial block such as, for example, the initial block 200 illustrated in FIGS. 2A-2B. The identified root certificate is associated with a root CA, such as, for example, the root certificate authority 112 illustrated in FIG. 1A.

The inquiry may be received at a computer system, for example, through a network interface or another type of communication interface. The inquiry may be received, for example, by a root certificate authority from another entity (e.g., an end entity or another certificate authority) in a cryptography system. In some cases, the inquiry is received from an entity that is attempting to validate a certificate in a certificate chain for which the root certificate serves as a root of trust. In various implementations, the inquiry may be or may be similar to an Online Certificate Status Protocol (OCSP) inquiry, a Certificate Revocation List (CRL) inquiry or another type of status inquiry; the inquiry may have another form or format.

At 404, the identified root certificate is cryptographically verified against a cryptographically authenticated database that represents the root CA. In various implementations, the cryptographically authenticated database may be implemented as a chain of data blocks that represents the root CA. The cryptographically authenticated database includes a plurality of distinct root certificates of the root certificate authority, including the root certificate identified in the inquiry received at 402. For example, in some implementations, the plurality of distinct root certificates may be the root certificates (202A, 202B, 202C, 216) illustrated in FIGS. 2A-2B and the identified root certificate may be, for example, the root certificate 202A or another root certificate. The cryptographically authenticated database also includes validity information that represents the validity or invalidity of each certificate of the plurality of distinct root certificates.

The validity information can be, or may include, one or more digital signatures of the root CA. The digital signatures of the root CA in the validity information are distinct from the digital signatures in the individual root certificates. For instance, the validity information can be the digital signatures 205A, 205B, 205C shown in FIG. 2A. In such cases, cryptographically verifying the validity of the identified root certificate against the cryptographically authenticated database includes verifying one or more of the digital signatures in the validity information. In some implementations, cryptographically verifying the validity of the identified root certificate includes verifying digital signatures associated with all of the root CA's valid key pairs. For instance, in the example shown in FIG. 2A, cryptographically verifying the validity of root certificate 202A includes verifying the signatures 205A, 205B, 205C; in the example shown in FIG. 2B, cryptographically verifying the validity of root certificate 216 includes verifying Signature 2", Signature 3" and Signature 4".

In some implementations, cryptographically verifying the validity of the identified root certificate includes additional operations to verify one or more components in a chain of data blocks. In some cases, the cryptographically authenticated database includes hash values that provide a link between data blocks in a chain of data blocks, and cryptographically verifying the validity of the identified root certificate against the cryptographically authenticated database includes verifying the hash values. In some cases, the cryptographically authenticated database includes one or more action blocks, and cryptographically verifying the validity of the identified root certificate against the cryptographically authenticated database includes processing the action blocks to determine a current state of the identified root certificate.

At step 406, a determination concerning the validity of the identified root certificate is provided. For example, the determination may be provided by sending a message indicating that the identified root certificate is valid or invalid. The determination is based on the validity information in the cryptographically authenticated database. For instance, if the appropriate digital signatures are verified and the identified root certificate has not expired and has not been revoked, then the determination may indicate that the identified root certificate is valid. If the appropriate digital signatures cannot be verified or if the identified root certificate has expired or has been revoked, then the determination may indicate that the identified root certificate is invalid. In various implementations, the determination may be signed with a private key that is not revoked and is not paired with the public key of the identified root certificate. Thus, multiple digital signatures from different valid private keys can be used to authenticate the validity of the identified root certificate.

Figure 5:
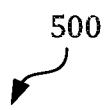
FIG. 5 is a block diagram of an example computer system.
Figure 5:
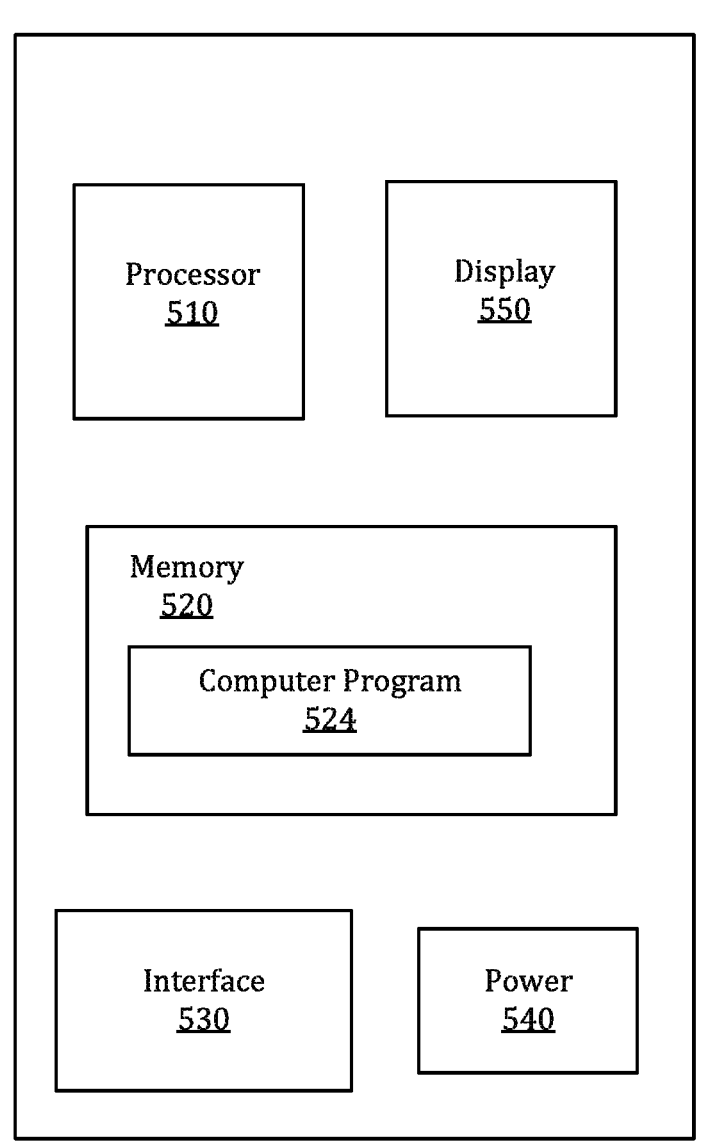

FIG. 5 is a block diagram showing an example of a computer system 500 that includes a data processing apparatus and one or more computer-readable storage devices. The term "data-processing apparatus" encompasses all kinds of apparatus, devices, nodes, and machines for processing data, including by way of example a programmable processor, a computer, a system on a chip, or multiple ones, or combinations, of the foregoing, e.g. processor 510. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g. computer program 524, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g. processor 510, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g. memory 520. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 540 provides power to the other components of the computer system 500. For example, the other components may operate based on electrical power provided by the power unit 540 through a voltage bus or other connection. In some implementations, the power unit 540 includes a battery or a battery system, for example, a rechargeable battery. In some implementations, the power unit 540 includes an adapter (e.g., an AC adapter) that receives an external power signal (from an external source) and coverts the external power signal to an internal power signal conditioned for a component of the computer system 500. The power unit 540 may include other components or operate in another manner.

To provide for interaction with a user, operations can be implemented on a computer having a display device, e.g. display 550, (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The computer system 500 may include a single computing device, or multiple computers that operate in proximity or generally remote from each other and typically interact through a communication network, e.g. via interface 530. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

The example interface 530 may provide communication with other systems or devices. In some cases, the interface 530 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 530 includes a wired communication interface (e.g., USB, Ethernet) that can be connected to one or more input/output devices, such as, for example, a keyboard, a pointing device, a scanner, or a networking device such as a switch or router, for example, through a network adapter.

Figure 6:
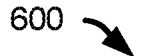
FIG. 6 is a diagram illustrating an example process for generating a cryptographically authenticated database of root certificates.
Figure 6:
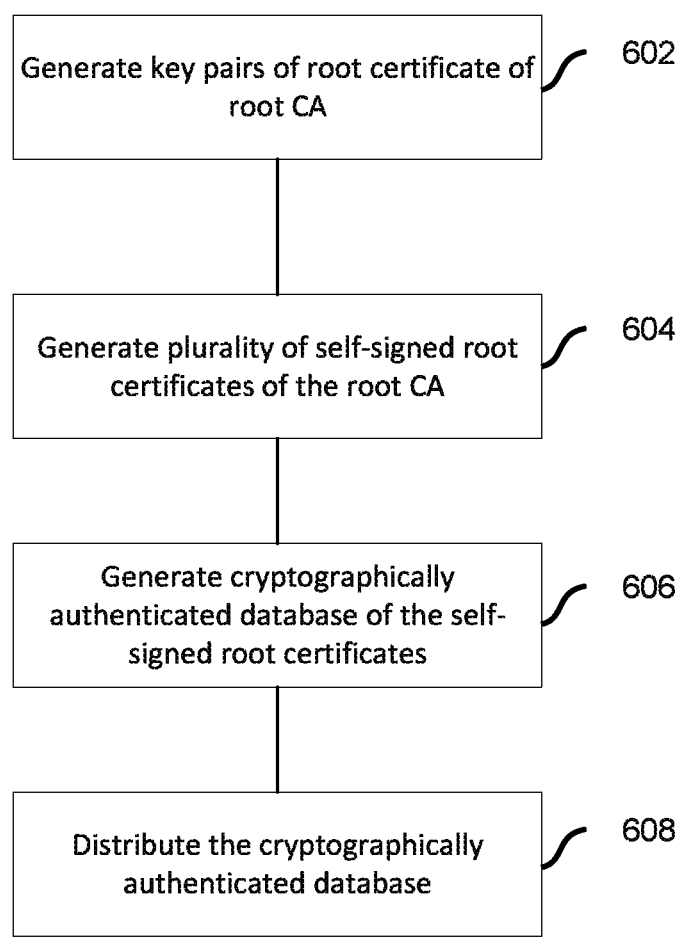

FIG. 6 is a diagram illustrating an example process 600 for generating a cryptographically authenticated database of root certificates. For example, the process 600 may generate the example chain of data blocks 120 shown in FIG. 1, the example chain of data blocks shown in FIGS. 2A and 2B, or another type of cryptographically authenticated database of root certificates. The example process 600 can be performed by a computer system, for example, by a computer system associated with the root CA 112 shown in FIG. 1A or another type of computer system. In some cases, one or more operations in the process 300 can be performed by the example computer system 128 shown in FIG. 1C. The example process 600 may include additional or different operations, and the operations may be performed in the order shown or in another order. In some cases, one or more of the operations shown in FIG. 6 are implemented as processes that include multiple operations, sub-processes, or other types of routines. In some cases, operations can be combined, performed in another order, performed in parallel, iterated or otherwise repeated, or performed another manner.

At 602, a plurality of distinct cryptographic key pairs are generated for a root certificate authority. Each of the distinct cryptographic key pairs includes a public key and a private key. The key pairs can include ECC key pairs, RSA key pairs, or a combination of these and other types of cryptographic key pairs. In various implementations the root certificate authority could be, for example, the root certificate authority 112 illustrated in FIG. 1A or another root certificate authority.

At 604, a plurality of distinct self-signed root certificates of the root certificate authority are generated based on the plurality of cryptographic key pairs. In various implementations, the distinct self-signed root certificates may include, for example, the root certificates 202A, 202B, 202C illustrated in FIG. 2B or another plurality of root certificate. The root certificates may be formatted according to a standard (e.g., X.509 or another standard) or they may have another forma. Each of the self-signed root certificates includes an identity of the root certificate authority as well as a public key of one of the cryptographic key pairs and a digital signature that is created using the private key that corresponds to the public key in the root certificate.

At 606, a cryptographically authenticated database is generated that represents the root certificate authority. In various implementations, the cryptographically authenticated database may be, for example, the chain of data blocks 120 shown in FIG. 1A or another chain of data blocks. In some cases, the cryptographically authenticated database is generated by the process 300 shown in FIG. 3. For instance, the cryptographically authenticated database may be generated by appending one or more signatures to the plurality of distinct self-signed root certificates of the root certificate authority. As an example, generating the cryptographically authenticated database may include generating the digital signatures 205A, 205B, 205C illustrated in FIG. 2B.

At 608, the cryptographically authenticated database is distributed to other entities in a public key infrastructure. The other entities then use the information contained in the cryptographically authenticated database to cryptographically verify the validity or invalidity of each of the distinct self-signed root certificates. In various implementations, the other entities may include, for example, intermediate certificate authorities or end entities.

In a general aspect, a cryptography system utilizes a cryptographically authenticated database that represents a multiple-key-pair root certificate authority (CA). In some implementations, the cryptography system also enables validation of certificates of a multiple-key-pair root CA.

In a first example, an inquiry regarding the validity of an identified root certificate of a root CA is received from an entity. The validity of the identified root certificate is cryptographically verified against a cryptographically authenticated database representing the root CA. The cryptographically authenticated database includes a plurality of distinct root certificates of the root CA such that the plurality of distinct root certificates includes the identified root certificate. The cryptographically authenticated database also includes validity information representing validity or invalidity of each of the plurality of distinct root certificates. A determination is provided to the entity regarding the validity of the identified root certificate.

In implementations of the first example, the root certificate authority has a plurality of distinct cryptographic key pairs. Each of the plurality of distinct cryptographic key pairs includes a public key and a private key. Each of the plurality of distinct root certificates corresponds to a respective key pair of the plurality of distinct cryptographic key pairs and includes a identity of the root certificate authority, the public key of the respective key pair, and a digital signature that is generated using the private key of the respective key pair.

In some instances of the first example, the digital signatures in the plurality of distinct root certificates are a first plurality of digital signatures of the root certificate authority and the validity information includes a second plurality of digital signatures of the root certificate authority. Each of the second plurality of digital signatures is generated by a respective private key of the plurality of distinct cryptographic key pairs. Cryptographically verifying the validity of a root certificate includes verifying the second plurality of digital signatures of the root certificate authority.

In some implementations of the first example, the validity information records changes in the plurality of distinct cryptographic key pairs. In some instances, the changes may include an update, replacement, revocation, or addition of a key pair.

In some implementations of the first example, the cryptographically authenticated database includes a cryptographically authenticated chain of data blocks. In some implementations of the first example, in response to cryptographically verifying that the identified root certificate is valid, the identified root certificate is used to cryptographically verify the validity of a digital certificate issued by the root certificate authority.

In a second example, a computer system includes a one or more processors, and memory storing instructions that are operable, when executed by the one or more processors, to perform one or more operations of the first example. In a third example, a non-transitory computer-readable medium comprises instructions that are operable when executed by data processing apparatus to perform one or more operations of the first example.

In a fourth example, a plurality of distinct cryptographic key pairs of a root certificate authority are generated. Each of the plurality of distinct cryptographic key pairs includes a public key and a corresponding private key. A plurality of distinct self-signed root certificates of the root certificate authority are generated. The plurality of distinct self-signed root certificates are based on the plurality of distinct cryptographic key pairs. Each of the plurality of distinct self-signed root certificates corresponds to a respective key pair of the plurality of distinct cryptographic key pairs. Each of the plurality of distinct self-signed root certificates includes an identity of the root certificate authority, the public key of the respective key pair, and a digital signature that is generated using the private key of the respective key pair. A cryptographically authenticated database is generated representing the root certificate authority. The cryptographically authenticated database includes the plurality of distinct self-signed root certificates of the root certificate authority and validity information representing the validity or invalidity of each of the plurality of self-signed root certificates. The cryptographically authenticated database is distributed to entities in a public key infrastructure. The entities can use the validity information to cryptographically verify the validity or invalidity of each of the plurality of distinct self-signed root certificate.

In some implementations of the fourth example, the digital signatures in the plurality of distinct self-signed root certificates are a first plurality of digital signatures of the certificate authority. The validity information includes a second plurality of digital signatures of the root certificate authority. Each of the second plurality of digital signatures is generated by a respective private key of the plurality of distinct cryptographic key pairs.

In some aspects of the fourth example, generating the cryptographically authenticated database includes generating an initial block of a cryptographically authenticated chain of data blocks.

In some implementations of the fourth example, generating the initial block includes generating a data block that includes the plurality of distinct self-signed root certificates, generating the second plurality of digital signatures based on the data block, and appending the second plurality of digital signatures to the data block to form the initial block.

In some aspects of the fourth example, generating the cryptographically authenticated database includes generating an initial block and a first action block of a cryptographically authenticated chain of data blocks.

In some aspects of the fourth example, generating the initial block includes generating a first data block that includes a first subset of distinct self-signed root certificates, generating a first subset of the second plurality of digital signatures based on the first data block, appending the first subset of the second plurality of digital signatures to the first data block to form the initial block. Generating the first action block includes generating a second data block comprising a second subset of distinct self-signed root certificates, generating a hash of the initial block, generating a second subset of the second plurality of digital signatures based on a concatenation of the second data block and the hash, and appending the hash and the second subset of the second plurality of digital signatures to the second data block to form the first action block.

In some aspects of the fourth example, generating a second action block includes generating a third data block comprising a third subset of distinct self-signed root certificates, generating a hash of an immediately preceding action block, generating a third subset of the second plurality of digital signatures based on a concatenation of the second data block and the hash, and appending the hash and the third subset of the second plurality of digital signatures to the third data block to form the second action block In some implementations of the fourth example, the initial block includes the plurality of distinct root certificates, and the action block indicates that at least one of the plurality of distinct root certificates is invalid.

In a fifth example, a computer system includes one or more processors and memory storing instructions that are operable when executed by the one or more processors to perform one or more operations of the fourth example. In a sixth example, a non-transitory computer-readable medium comprises instructions that are operable when executed by data processing apparatus to perform one or more operations of the fourth example.

In some aspects, methods and systems are provided for constructing a cryptographically authenticated database and managing the cryptographically authenticated database according to a plurality of distinct root certificates of a root CA. In some cases, an initial block is constructed with data entries for each distinct root certificate of the plurality of distinct root certificates. In another example, a new data block is constructed with one or more data entries, in which each entry includes an action type field indicating a change (e.g., a change in status of a distinct root certificate of the plurality of distinct root certificates). The new data block is chained from the initial block or a subsequent block in the chain of data blocks.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   generating a plurality of distinct cryptographic key pairs of a root certificate authority, each of the plurality of distinct cryptographic key pairs comprising a public key and a private key;
   generating a plurality of distinct self-signed root certificates of the root certificate authority, the plurality of distinct self-signed root certificates based on the plurality of distinct cryptographic key pairs, each of the plurality of distinct self-signed root certificates corresponding to a respective key pair of the plurality of distinct cryptographic key pairs and comprising:
      an identity of the root certificate authority;
      the public key of the respective key pair; and
      a digital signature generated using the private key of the respective key pair,
   generating a cryptographically authenticated database representing the root certificate authority and comprising:
      the plurality of distinct self-signed root certificates of the root certificate authority; and
      validity information representing validity or invalidity of each of the plurality of self-signed root certificates; and
   distributing the cryptographically authenticated database to entities in a public key infrastructure, wherein the entities can use the validity information to cryptographically verify the validity or invalidity of each of the plurality of distinct self-signed root certificates.

2. The method of claim 1, wherein:
   the digital signatures in the plurality of distinct self-signed root certificates are a first plurality of digital signatures of the root certificate authority; and
   the validity information comprises a second plurality of digital signatures of the root certificate authority, each of the second plurality of digital signatures generated by a respective private key of the plurality of distinct cryptographic key pairs.

3. The method of claim 2, wherein generating the cryptographically authenticated database comprises generating an initial block of a cryptographically authenticated chain of data blocks.

4. The method of claim 3, wherein generating the initial block comprises:

generating a data block comprising the plurality of distinct self-signed root certificates;

generating the second plurality of digital signatures based on the data block; and appending the second plurality of digital signatures to the data block to form the initial block.

5. The method of claim 2, wherein generating the cryptographically authenticated database comprises generating an initial block and a first action block of a cryptographically authenticated chain of data blocks.

6. The method of claim 5, wherein:

generating the initial block comprises:

generating a first data block comprising a first subset of distinct self-signed root certificates;

generating a first subset of the second plurality of digital signatures based on the first data block; and appending the first subset of the second plurality of digital signatures to the first data block to form the initial block, and generating the first action block comprises:

generating a second data block comprising a second subset of distinct self-signed root certificates;

generating a hash of the initial block;

generating a second subset of the second plurality of digital signatures based on a concatenation of the second data block and the hash; and appending the hash and the second subset of the second plurality of digital signatures to the second data block to form the first action block.

7. The method of claim 6, wherein generating a second action block comprises:

generating a third data block comprising a third subset of distinct self-signed root certificates;

generating a hash of a preceding action block;

generating a third subset of the second plurality of digital signatures based on a concatenation of the third data block and the hash of the immediately preceding action block; and appending the hash of the preceding action block and the third subset of the second plurality of digital signatures to the third data block to form the second action block.

8. The method of claim 5, wherein the initial block comprises the plurality of distinct self-signed root certificates, and the action block indicates that at least one of the plurality of distinct self-signed root certificates is invalid.

9. A computer system comprising:

one or more processors; and memory storing instructions that are operable when executed by the one or more processors to perform operations comprising:

generating a plurality of distinct cryptographic key pairs of a root certificate authority, each of the plurality of distinct cryptographic key pairs comprising a public key and a private key;

generating a plurality of distinct self-signed root certificates of the root certificate authority, the plurality of distinct self-signed root certificates based on the plurality of distinct cryptographic key pairs, each of the plurality of distinct self-signed root certificates corresponding to a respective key pair of the plurality of distinct cryptographic key pairs and comprising:

an identity of the root certificate authority;

the public key of the respective key pair; and a digital signature generated using the private key of the respective key pair, generating a cryptographically authenticated database representing the root certificate authority and comprising:

the plurality of distinct self-signed root certificates of the root certificate authority; and validity information representing validity or invalidity of each of the plurality of self-signed root certificates; and distributing the cryptographically authenticated database to entities in a public key infrastructure, wherein the entities can use the validity information to cryptographically verify the validity or invalidity of each of the plurality of distinct self-signed root certificates.

10. The system of claim 9, wherein:

the digital signatures in the plurality of distinct self-signed root certificates are a first plurality of digital signatures of the root certificate authority; and the validity information comprises a second plurality of digital signatures of the root certificate authority, each of the second plurality of digital signatures generated by a respective private key of the plurality of distinct cryptographic key pairs.

11. The system of claim 10, wherein generating the cryptographically authenticated database comprises generating an initial block of a cryptographically authenticated chain of data blocks.

12. The system of claim 11, wherein generating the initial block comprises:

generating a data block comprising the plurality of distinct self-signed root certificates;

generating the second plurality of digital signatures based on the data block; and appending the second plurality of digital signatures to the data block to form the initial block.

13. The system of claim 10, wherein generating the cryptographically authenticated database comprises generating an initial block and a first action block of a cryptographically authenticated chain of data blocks.

14. The system of claim 13, wherein:

generating the initial block comprises:

generating a first data block comprising a first subset of distinct self-signed root certificates;

generating a first subset of the second plurality of digital signatures based on the first data block; and appending the first subset of the second plurality of digital signatures to the first data block to form the initial block, and generating the first action block comprises:

generating a second data block comprising a second subset of distinct self-signed root certificates;

generating a hash of the initial block;

generating a second subset of the second plurality of digital signatures based on a concatenation of the second data block and the hash; and appending the hash and the second subset of the second plurality of digital signatures to the second data block to form the first action block.

15. The system of claim 14, wherein generating a second action block comprises:

generating a third data block comprising a third subset of distinct self-signed root certificates;

generating a hash of a preceding action block;

generating a third subset of the second plurality of digital signatures based on a concatenation of the third data block and the hash of the preceding action block; and appending the hash of the preceding action block and the third subset of the second plurality of digital signatures to the third data block to form the second action block.

16. The system of claim 13, wherein the initial block comprises the plurality of distinct self-signed root certificates, and the action block indicates that at least one of the plurality of distinct self-signed root certificates is invalid.

17. A non-transitory computer-readable medium comprising instructions that, when executed by data processing apparatus, perform operations comprising:

generating a plurality of distinct cryptographic key pairs of a root certificate authority, each of the plurality of distinct cryptographic key pairs comprising a public key and a private key;

generating a plurality of distinct self-signed root certificates of the root certificate authority, the plurality of distinct self-signed root certificates based on the plurality of distinct cryptographic key pairs, each of the plurality of distinct self-signed root certificates corresponding to a respective key pair of the plurality of distinct cryptographic key pairs and comprising:

an identity of the root certificate authority;

the public key of the respective key pair; and a digital signature generated using the private key of the respective key pair, generating a cryptographically authenticated database representing the root certificate authority and comprising:

the plurality of distinct self-signed root certificates of the root certificate authority; and validity information representing validity or invalidity of each of the plurality of self-signed root certificates; and distributing the cryptographically authenticated database to entities in a public key infrastructure, wherein the entities can use the validity information to cryptographically verify the validity or invalidity of each of the plurality of distinct self-signed root certificates.

18. The computer-readable medium of claim 17, wherein:

the digital signatures in the plurality of distinct self-signed root certificates are a first plurality of digital signatures of the root certificate authority; and the validity information comprises a second plurality of digital signatures of the root certificate authority, each of the second plurality of digital signatures generated by a respective private key of the plurality of distinct cryptographic key pairs.

19. The computer-readable medium of claim 18, wherein generating the cryptographically authenticated database comprises generating an initial block of a cryptographically authenticated chain of data blocks.

20. The computer-readable medium of claim 19, wherein generating the initial block comprises:

generating a data block comprising the plurality of distinct self-signed root certificates;

generating the second plurality of digital signatures based on the data block; and appending the second plurality of digital signatures to the data block to form the initial block.

21. The computer-readable medium of claim 18, wherein generating the cryptographically authenticated database comprises generating an initial block and a first action block of a cryptographically authenticated chain of data blocks.

22. The computer-readable medium of claim 21, wherein:

generating the initial block comprises:

generating a first data block comprising a first subset of distinct self-signed root certificates;

generating a first subset of the second plurality of digital signatures based on the first data block; and appending the first subset of the second plurality of digital signatures to the first data block to form the initial block, and generating the first action block comprises:

generating a second data block comprising a second subset of distinct self-signed root certificates;

generating a hash of the initial block;

generating a second subset of the second plurality of digital signatures based on a concatenation of the second data block and the hash; and appending the hash and the second subset of the second plurality of digital signatures to the second data block to form the first action block.

23. The computer-readable medium of claim 22, wherein generating a second action block comprises:

generating a third data block comprising a third subset of distinct self-signed root certificates;

generating a hash of a preceding action block;

generating a third subset of the second plurality of digital signatures based on a concatenation of the third data block and the hash of the preceding action block; and appending the hash of the preceding action block and the third subset of the second plurality of digital signatures to the third data block to form the second action block.

24. The computer-readable medium of claim 21, wherein the initial block comprises the plurality of distinct self-signed root certificates, and the action block indicates that at least one of the plurality of distinct self-signed root certificates is invalid.

* * * * *